Feb. 12, 1946. H. C. MANN 2,394,555
TENSILE TEST SPECIMEN CHUCK
Filed Jan. 29, 1944
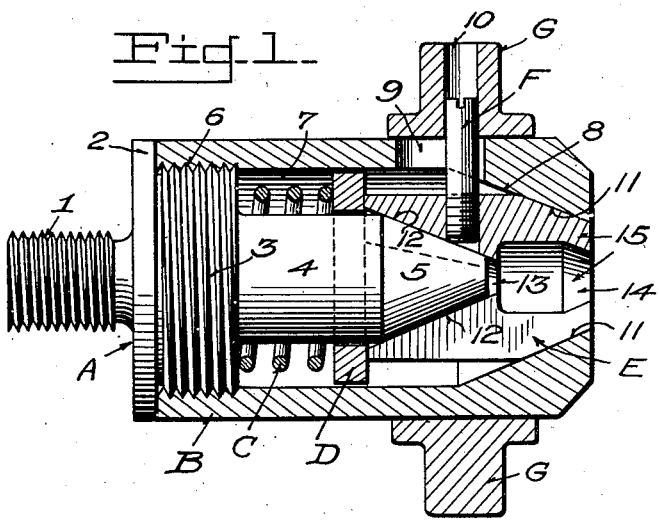
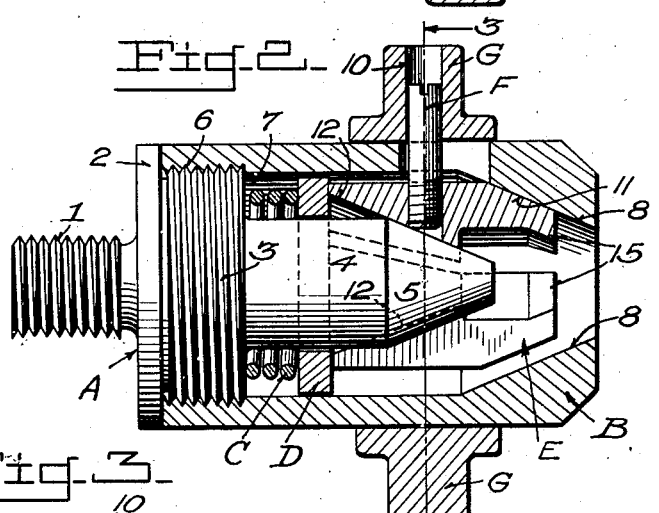
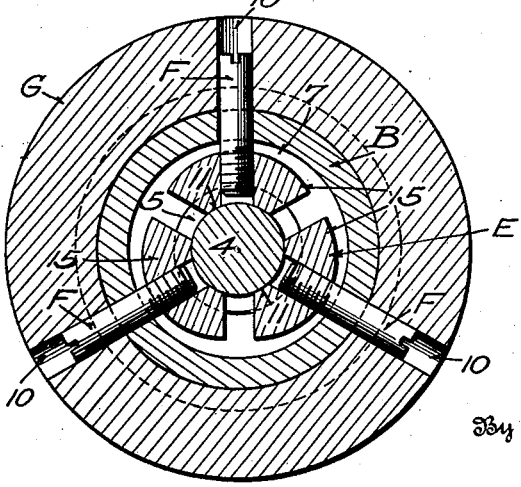
Inventor
HAROLD C. MANN,
By C.E. Herrstrom & H.E. Thibodeau
Attorneys Patented Feb. 12, 1946

2,394,555

UNITED STATES PATENT OFFICE 2,394,555

TENSILE TEST SPECIMEN CHUCK

Harold C. Mann, Arlington, Mass.

Application January 29, 1944, Serial No. 520,169

4 Claims. (Cl. 279—65)

(Granted under the act of March 3, 1883, as
amended April 30, 1928; 370 O. G. 757)

The invention described herein may be manufactured and used by or for the Government for governmental purposes without the payment to me of any royalty thereon.

This invention relates to an improved chuck particularly adapted for holding tensile test specimens while being subjected to the stresses incident to the tensile test.

When using conventional round, machined tensile test specimens with threaded ends, considerable expense is incurred and time lost in threading the ends of the specimens. In addition the time consumed in screwing the specimens in and out of the holders may amount to an appreciable part of the time necessary for making a test. The time necessary for threading the specimens may in some cases amount to more than one-half of the total time necessary to prepare a specimen, and consequently delay completion of the tensile test by just that much.

In adapting a retractable multi-sector jaw type of chuck to the purposes of large production testing on a tensile testing machine, certain improvements were found to be of advantage in greatly increasing the speed and ease of receiving and releasing specimens. A pair of chucks embodying the improvements of this invention, when put into use resulted in a saving of 60% of the time formerly needed for set up and removal of the test specimen. In addition, an improved axial alignment in testing was realized with a resultant improvement in uniformity from the start of initial loading, on autographically recorded curves, together with less divergence than is usually the case with conventional thread-end specimens.

Accordingly, it is the purpose of this invention to provide an improved type of holder which does not require a threaded specimen and accomplishes savings in both cost and time.

The specific nature of this invention as well as other objects and advantages thereof will clearly appear from a description of a preferred embodiment as shown in the accompanying drawing in which:

Fig. 1 is a longitudinal sectional view of the specimen chuck showing the jaws in the closed position.

Fig. 2 is a view similar to Fig. 1 showing the jaws in the open position.

Fig. 3 is a cross sectional view taken along the plane 3—3 of Fig. 2.

In Fig. 1 there is shown in assembled relationship in longitudinal section a chuck or specimen holder embodying this invention.

The chuck consists of a tri-sected jaw assembly E, assembled in a housing B together with the necessary manipulative parts, such as spring C, thrust washer D, sliding collar G and locating pins F, all assembled on a stud A which serves as a base for the assembly, a spreader for the jaws, and the means for attaching the chuck to the machine.

More specifically, stud A in Figs. 1 and 2 has a shank 1 threaded to fit the machine in which the chuck is to be used, but any other manner of attaching or holding the chuck may be used. Next to the shank is a short section 2 of enlarged diameter which serves as a shoulder in assembly with the housing B, in which it is fastened by means of the thread 3. The portion 4 to the right of the thread is of much smaller diameter and serves as an arbor for the spring C and the sliding washer D. The front end 5 of the stud A is tapered, and serves as a spreader for the jaw assembly E when it is pushed back.

The housing B has a female thread 6 which screws onto the thread 3 of the stud A and holds the housing B tightly against the shoulder 2. Beyond the thread 6 is a hollow cylindrical portion 7 in which the spring C and the thrust washer D are assembled.

The spring C is assembled under compression between the shoulder formed at the juncture of portions 3 and 4 of stud A and the thrust washer D, exerting sufficient pressure against the washer D so that it in turn holds the jaw assembly E in the extreme forward position as shown in Fig. 1 in which position the three sectors 15 of the jaw assembly E are closed, being held in the closed position by the tapered inside 8 of the forward portion of the housing B. The sectors 15 of the jaw assembly E are so shaped as to form a hollow cylindrical space 14 back of a smaller opening 13 and conical throat 12 when assembled in the closed position.

Each sector 15 of the jaw assembly E is drilled and tapped for a screw F. Each screw extends up thru a respective slot 9 in the housing B and into the corresponding hole 10 in the collar G. The slots 9 are located so that they are in alignment with the screws F in the jaw sectors E and permit reciprocating movement of the jaw sectors E within the limits of the closed position shown in Fig. 1 and the open position in which the cylindrical portion 11 of the jaw sectors is in contact with the cylindrical inner surface 7 of the housing B. In this position the thrust washer D is forced back toward the shoulder of the stud A, resulting in maximum compression of the spring C. The collar G slides on the outside of the housing B and has three holes 10 of such diameter and location that they are in alignment with the pin holes in the jaw sectors 15 and the slots 9 in the housing B. The screws F extend out into the collar G such a distance that they will not protrude when the jaw sectors 15 are in the open position and yet will extend into the holes 10 in the collar G a sufficient distance when the jaws E are closed to insure satisfactory manipulation of the jaw assembly E by means of the collar G.

The tensile test specimen (not shown) is fabricated with the ends corresponding to the space within the jaw assembly E, i. e., a cylindrical shank, tapered toward the middle to correspond with the length, size and taper in the jaw assembly E when in the closed position shown in Fig. 1.

To utilize the chuck, the collar G is pushed to the rear position, this motion being conveyed by means of the screws F thru the slots 9 to the sectors 15 of the jaw assembly E which are in turn moved back, but at the same time the conical form of the end 5 of the stud A acts as a spreader and forces the sectors 15 apart so that the opening 13 is now of greater diameter than that of the cylindrical portion 14 of the jaw assembly E in the closed position shown in Fig. 1. In this position the shank of the test specimen can be inserted thru the opening 13 into the space between the jaws E, whereupon the collar G is released and the spring C causes the thrust washer D to push the jaw sectors 15 back to the forward and closed position in which position the test specimen is held securely against any tensile stress. To release the specimen, the collar G is again pushed back thus opening the jaws 15 and the specimen slipped out.

It is thus seen that the time and expense necessary for threading the specimen are saved and particularly the time for assembling the test specimen in the machine and removing it when the test is concluded have been reduced to a negligible value.

Numerous other applications of this invention such, for example, as holders for the rods which have to be changed or moved frequently or as a locking device in the case of any reciprocating motion, will occur to those skilled in the art. In some of these applications it may be desirable to vary some of the mechanical details to suit the demands of a different combination of conditions and requirements, but the adaptation of this invention will be sufficiently clear so that its application will be obvious.

I claim:

1. A chuck comprising a hollow body, one end of the hollow portion of said body defining a first interior conical surface, a multi-sector jaw assembly slidably mounted within said hollow portion, said jaw assembly having an exterior conical surface arranged to cooperate with said first interior conical surface of the body, a plug member secured to the other end of said body, a conical end portion of said plug member projecting into said hollow portion of the body, and said jaw assembly having a recess defining a second interior conical surface arranged to cooperate with said conical end portion whereby movement of said jaw assembly relative to the axis of said body effects a radial movement of the sectors of said jaw assembly with respect to the axis of said body.

2. A chuck comprising a hollow body, one end of the hollow portion of said body defining a first interior conical surface, a multi-sector jaw assembly slidably mounted within said hollow portion, said jaw assembly having an exterior conical surface arranged to cooperate with said first interior conical surface of the body, a plug member secured to the other end of said body, a conical end portion of said plug member projecting into said hollow portion of the body, said jaw assembly having a recess defining a second interior conical surface arranged to cooperate with said conical end portion whereby movement of said jaw assembly relative to the axis of said body effects a radial movement of the sectors of said jaw assembly with respect to the axis of said body, an operating washer surrounding said body and slidably mounted thereon, and an extension on each sector of said jaw assembly projecting thru respective slots in said body and connected to said operating washer.

3. A chuck comprising a hollow cylindrical body, one end of the hollow portion of said body being interiorly threaded and the other end shaped to define a first interior conical surface, a plug member screwed into the threaded end of said body, a reduced diameter portion of said plug member projecting into the hollow portion of said body and terminating in a conical end of equal slope to said first interior conical surface, a multi-sector jaw assembly slidably mounted within said body, said assembly having an exterior conical surface arranged to cooperate with said interior conical surface of the body and a recess defining a second interior conical surface arranged to cooperate with said conical end of said plug member, whereby movement of said jaw assembly relative to the axis of said body effects a radial movement of the sectors of said jaw assembly with respect to the axis of said body.

4. A chuck comprising a hollow cylindrical body, one end of the hollow portion of said body being interiorly threaded and the other end shaped to define a first interior conical surface, a plug member screwed into the threaded end of said body, a reduced diameter portion of said plug member projecting into the hollow portion of said body and terminating in a conical end of equal slope to said first interior conical surface, a multi-sector jaw assembly slidably mounted within said body, said assembly having an exterior conical surface arranged to cooperate with said interior conical surface of the body, a recess defining a second interior conical surface arranged to cooperate with said conical end of said plug member whereby movement of said jaw assembly relative to the axis of said body effects a radial movement of the sectors of said jaw assembly with respect to the axis of said body, an operating ring surrounding said body and slidably mounted thereon, and a pin radially mounted on each sector of said jaw assembly projecting thru respective slots in said body and connected to said operating ring.

HAROLD C. MANN.